United States Patent
Usui (10) Patent No.: US 7,233,783 B2
(45) Date of Patent: Jun. 19, 2007

(54) MOBILE TELEPHONE SYSTEM CAPABLE OF EFFECTIVELY UTILIZING GPS INFORMATION EVEN IF DIRECT RECEPTION BY A MOBILE TELEPHONE APPARATUS IS DIFFICULT

(75) Inventor: Hisayoshi Usui, Saitama (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 10/740,027

(22) Filed: Dec. 18, 2003

(65) Prior Publication Data

US 2004/0132516 A1 Jul. 8, 2004

Related U.S. Application Data

(62) Division of application No. 09/839,096, filed on Apr. 20, 2001, now Pat. No. 6,954,648.

(30) Foreign Application Priority Data

Apr. 20, 2000 (JP) ............................. 2000-118900

(51) Int. Cl.
*H04M 11/04* (2006.01)
(52) U.S. Cl. .............................. 455/404.2; 455/456.1; 342/357.07
(58) Field of Classification Search ............. 455/575.7, 455/95, 404.2, 456.1, 9, 10, 11.1, 404.1–2, 455/67.11, 115.1–2; 342/357.06–12
See application file for complete search history.

(56) References Cited

U.S. PATENT DOCUMENTS 5,604,765 A 2/1997 Bruno et al.
5,740,049 A * 4/1998 Kaise .......................... 701/217

(Continued)

FOREIGN PATENT DOCUMENTS

DE 199 23 833 A1 12/1999

(Continued)

*Primary Examiner*—CongVan Tran
(74) *Attorney, Agent, or Firm*—Scully, Scott, Murphy & Presser, P.C.

(57) ABSTRACT

In a mobile telephone system including a mobile telephone base station (20) connected to a telephone network (40) and a mobile telephone apparatus (10) which includes a first GPS unit for receiving a GPS wave as a first received GPS signal to obtain position data of the mobile telephone apparatus by information processing with reference to the first received GPS signal and a radio section for transmitting, by radio communication, the position data of the mobile telephone apparatus to the mobile telephone base station to make the mobile telephone base station inform the telephone network of the position data of the mobile telephone apparatus, the mobile telephone base station includes a mobile telephone base section for transmitting, by radio communication, position information of the mobile telephone base station to the mobile telephone apparatus to enable the mobile telephone apparatus to use the position information of the mobile telephone base station instead of the position data of the mobile telephone apparatus. Preferably, the mobile telephone base station further includes a second GPS unit for receiving the GPS wave as a second received GPS signal to obtain the position information of the mobile telephone base station by information processing with reference to the second received GPS signal. The mobile telephone base section is connected to the second GPS unit to be supplied with the position information of the mobile telephone base station from the second GPS unit.

3 Claims, 6 Drawing Sheets

U.S. PATENT DOCUMENTS

| | | | |
|---|---|---|---|
| 6,061,561 A | 5/2000 | Alanara et al. | |
| 6,097,974 A * | 8/2000 | Camp et al. | 455/575.7 |
| 6,222,483 B1 | 4/2001 | Twitchell et al. | |
| 6,603,978 B1 * | 8/2003 | Carlsson et al. | 455/502 |
| 6,647,267 B1 * | 11/2003 | Britt et al. | 455/404.2 |
| 6,999,779 B1 * | 2/2006 | Hashimoto | 455/456.2 |

FOREIGN PATENT DOCUMENTS

| | | |
|---|---|---|
| GB | 2347035 | 8/2000 |
| GB | 2358515 | 7/2001 |
| JP | 6-213998 | 8/1994 |
| JP | 08-153075 | 6/1996 |
| JP | 8-265826 | 10/1996 |
| JP | 09-68566 | 3/1997 |
| JP | 9-98475 | 4/1997 |
| JP | 09-130861 | 5/1997 |
| JP | 09-281212 | 10/1997 |
| JP | 10-38993 | 2/1998 |
| JP | 10-79971 | 3/1998 |
| JP | 10-136437 | 5/1998 |
| JP | 11-18159 | 1/1999 |
| JP | 11-23690 | 1/1999 |
| JP | 11023690 A * | 1/1999 |
| JP | 11-75244 | 3/1999 |
| JP | 11-94923 | 4/1999 |
| JP | 11-113066 | 4/1999 |
| JP | 11-201765 | 7/1999 |
| WO | WO99/19743 | 4/1999 |
| WO | WO99/47943 | 9/1999 |
| WO | WO00/13034 | 3/2000 |

* cited by examiner

POWER SUPPLY
WAVEFORM OF
GPS UNIT

FIG. 6

POWER SUPPLY
WAVEFORM OF
GPS UNIT

MOBILE
TELEPHONE

FIG. 7

POWER SUPPLY
WAVEFORM OF
GPS UNIT

GPS RECEPTION

| POSITION DATA ACQUIRING METHOD | POSITION DATA | POSITION DATA ACQUIRING TIME INSTANT | CURRENT TIME INSTANT | RECEPTION STATE OF 1ST GPS |
|---|---|---|---|---|

POSITION DATA ACQUIRING METHOD : 1ST GPS or EXTERNAL GPS or 2ND GPS

POSITION DATA : LONGITUDE & LATITUDE

POSITION DATA ACQUIRING TIME INSTANT : YEAR/MONTH/DAY TIME

CURRENT TIME INSTANT : YEAR/MONTH/DAY TIME

RECEPTION STATE OF 1ST GPS UNIT : GOOD RECEPTION or BAD RECEPTION

FIG. 11

MOBILE TELEPHONE SYSTEM CAPABLE OF EFFECTIVELY UTILIZING GPS INFORMATION EVEN IF DIRECT RECEPTION BY A MOBILE TELEPHONE APPARATUS IS DIFFICULT

CROSS REFERENCE TO RELATED APPLICATION

The present application is a divisional of application Ser. No. 09/839,096 filed on Apr. 20, 2001 now U.S. Pat. No. 6,954,648.

BACKGROUND OF THE INVENTION

This invention relates to a mobile telephone system in which a mobile telephone apparatus comprises not only a radio section mainly serving as a mobile telephone set adapted to carry out radio communication but also a GPS unit adapted to receive GPS (Global Positioning System) information so that position data of the mobile telephone apparatus itself is acquired by information processing of the GPS information and reported, via radio communication to a mobile telephone base station, to a telephone network connected to the base station and, in particular, to a mobile telephone system which has a backup function in case where the mobile telephone apparatus is used in an environment such that the GPS unit thereof can not appropriately receive the GPS information and which achieves low power consumption and saving of a memory capacity in the mobile telephone apparatus.

Recently, in the field of mobile telephone communication, it is considered to use in a mobile telephone system a GPS unit capable of receiving GPS information transmitted from a GPS satellite and including time information, position information, and map information. This arises from a demand for applications in case where a user of a mobile telephone apparatus sends an emergency report via radio communication and another party involved in communication desires to identify a user's position or in case where another party searches the position of a possessor of a mobile telephone apparatus. In addition, there is also a demand for an application such that a user of a mobile telephone apparatus desires to acquire map information of his neighborhood for the sake of convenience.

As a known technique using the GPS unit in the field of mobile telephone communication, proposals have been made of a structure in which a mobile telephone base station comprises a GPS unit as in a radio telephone controller with GPS disclosed in Japanese Unexamined Patent Publication (JP-A) No. H06-213998, and another structure in which a mobile telephone apparatus comprises a, GPS unit as in a mobile telephone set with a GPS receiver disclosed in Japanese Unexamined Patent Publication (JP-A) No. H09-98475 and a mobile telephone with a GPS unit disclosed in Japanese Unexamined Patent Publication (JP-A) No. H11-18159.

Generally, a mobile telephone apparatus containing a GPS unit is not always used in a place where the GPS information from the GPS satellite can be received in a good condition but is often used in an unreceivable place, typically, an underground mall. In addition, in an automobile where the mobile telephone apparatus is frequently used, the GPS information is often impossible to receive. In order to effectively utilize the GPS information in such cases, the underground mall or a tunnel is provided with a GPS communication mobile telephone base station which covers a local region as a communication area. In the automobile, a GPS unit used as car navigation is mounted. In this manner, in case where the GPS information is difficult to be directly used by the GPS unit contained in the mobile telephone apparatus, the GPS information obtained by the GPS communication mobile telephone base station or the GPS unit mounted in the automobile is used instead.

As other known techniques related to data communication, including the GPS information, applicable to the mobile telephone apparatus, proposals have been made of a mobile information apparatus and a communication IC card used in the information apparatus disclosed in Japanese Unexamined Patent Publication (JP-A) No. H08-153075, a position information service system disclosed in Japanese Unexamined Patent Publication (JP-A) No. H09-68566, a method of providing information to a mobile terminal, an information providing system, and a mobile terminal disclosed in Japanese Unexamined Patent Publication (JP-A) No. H09-130861, a mobile object position detecting apparatus disclosed in Japanese Unexamined Patent Publication (JP-A) No. H09-281212, a mobile radio communication terminal position display apparatus disclosed in Japanese Unexamined Patent Publication (JP-A) No. H10-79971, and a data communication method, a mobile data communication apparatus, and a recording medium disclosed in Japanese Unexamined Patent Publication (JP-A) No. H11-113066.

In the mobile telephone system utilizing the GPS unit described above, countermeasures are taken to prepare for the circumstance where the GPS unit contained in the mobile telephone apparatus can not directly receive the GPS information in a good condition. Specifically, the GPS communication mobile telephone base station is arranged at the place where the reception of the GPS information is difficult. Alternatively, in case of the automobile, the GPS unit used as the car navigation is mounted. Thus, the GPS information obtained by the GPS communication mobile telephone base station or the GPS unit mounted in the automobile is used as a substitute. Nevertheless, if the reception state of the GPS information by the GPS unit contained in the mobile telephone apparatus is inferior, it is difficult to effectively utilize the GPS information.

Furthermore, in the mobile telephone apparatus containing the GPS unit, a large current consumption is required upon using the GPS unit as compared with a current consumption in a standby state of the mobile telephone apparatus itself. Therefore, it is difficult for the mobile telephone apparatus energized by an ordinary battery to desiredly use the GPS unit requiring a large power consumption. As a result, the GPS unit can not effectively be utilized.

Furthermore, in the mobile telephone apparatus provided with the GPS unit, a memory medium such as a semiconductor memory capable of memorizing an enormously large quantity of information is required in order to use map information contained in the GPS information directly obtained by the GPS unit contained therein. For example, in case where a CD-ROM or a DVD-ROM having a large memory capacity is used and utilized like in the car navigation, no problem will arise. However, in case where the map information is used only by the GPS unit contained in the mobile telephone apparatus, a special memory medium having a large memory capacity is required so that the reduction in size and weight required for the mobile telephone apparatus can not be assured and the increase in cost is inevitable. Thus, at present, it is not easy to obtain and use the map information by the GPS unit contained in the mobile telephone apparatus.

In addition, the mobile telephone apparatus is typically provided with a clock section indicative of a current time instant. However, the time instant in the clock section is much less accurate than the time instant information given by a frequency of a quartz oscillator and contained in the GPS information transmitted from the GPS satellite. Thus, the clock section presently used can not indicate an accurate time instant.

SUMMARY OF THE INVENTION

In order to solve the above-mentioned problems, it is a technical object of this invention to provide a mobile telephone system capable of effectively utilize GPS information by the use of radio communication even if a reception state of direct reception of the GPS information by a mobile telephone apparatus is inferior.

It is another object of this invention to provide a mobile telephone system capable of easily obtaining and utilizing map information.

It is yet another object of this invention to provide a mobile telephone system capable of achieving reduction in power consumption and memory capacity.

Mobile telephone systems according to this invention are as follows:

1) A mobile telephone system comprising:

a mobile telephone base station (20) connected to a telephone network (40); and a mobile telephone apparatus (10) which comprises a first GPS unit (6) for receiving a GPS wave as a first received GPS signal to obtain position data of the mobile telephone apparatus by information processing with reference to the first received GPS signal and a radio section (3) connected to the first GPS unit for transmitting, by radio communication, the position data of the mobile telephone apparatus to the mobile telephone base station to make the mobile telephone base station inform the telephone network of the position data of the mobile telephone apparatus;

the mobile telephone base station comprising a mobile telephone base section (22) for transmitting, by radio communication, position information of the mobile telephone base station to the mobile telephone apparatus to enable the mobile telephone apparatus to use the position information of the mobile telephone base station instead of the position data of the mobile telephone apparatus.

2) A mobile telephone system as described in the above-mentioned item 1), wherein:

the mobile telephone base station further comprises a second GPS unit (24) for receiving the GPS wave as a second received GPS signal to obtain the position information of the mobile telephone base station by information processing with reference to the second received GPS signal;

the mobile telephone base section being connected to the second GPS unit to be supplied with the position information of the mobile telephone base station from the second GPS unit.

3) A mobile telephone system as claimed in the above-mentioned item 1), wherein the mobile telephone base section transmits, by radio communication, the position information of the mobile telephone base station to the mobile telephone apparatus by including the position information in report information which is reported to the mobile telephone apparatus.

4) A mobile telephone system as described in the above-mentioned item 1), wherein the radio section of the mobile telephone apparatus transmits, when the first GPS unit does not receive the GPS wave and does not obtain the position data of the mobile telephone apparatus, the position information of the mobile telephone base station to the mobile telephone base station by radio communication instead of the position data of the mobile telephone apparatus to make the mobile telephone base station inform the telephone network of the position information of the mobile telephone base station instead of the position data of the mobile telephone apparatus.

5) A mobile telephone system as described in the above-mentioned item 4), wherein the mobile telephone apparatus further comprises a display section (2) for displaying map information specified by one of the position information of the mobile telephone base station and the position data of the mobile telephone apparatus, the mobile telephone apparatus receiving, upon display of the map information in the display section, the map information through the mobile telephone base station from the telephone network by transmitting the one of the position information of the mobile telephone base station and the position data of the mobile telephone apparatus through the mobile telephone base station to the telephone network, 6) A mobile telephone system as described in the above-mentioned item 5), wherein the map information is obtained by the use of a homepage of an internet connected through a router (40a) to the telephone network.

7) A mobile telephone system as described in the above-mentioned item 1), wherein the mobile telephone apparatus further comprises a control section (5) for carrying out power supply intermittent control to intermittently energize the first GPS unit so that the first GPS unit is intermittently turned on under the power supply intermittent control.

8) A mobile telephone system comprising:

a mobile telephone base station (20) connected to a telephone network (40);

a mobile telephone apparatus (10) which comprises a first GPS unit (6) for receiving a GPS wave as a first received GPS signal to obtain position data of the mobile telephone apparatus by information processing with reference to the first received GPS signal and a radio section (3) connected to the first GPS unit for transmitting, by radio communication, the position data of the mobile telephone apparatus to the mobile telephone base station to make the mobile telephone base station inform the telephone network of the position data of the mobile telephone apparatus; and an external GPS unit (11) external of the mobile telephone apparatus for receiving the GPS wave as an external received GPS signal to obtain external position data of the mobile telephone apparatus by information processing with reference to the external received GPS signal;

the mobile telephone apparatus being connected to the external GPS unit so as to use the external position data instead of the position data of the mobile telephone apparatus.

9) A mobile telephone system as described in the above-mentioned item 8), wherein the radio section of the mobile telephone apparatus transmits, when the first GPS unit does not receive the GPS wave and does not obtain the position data of the mobile telephone apparatus, the external position data to the mobile telephone base station by radio communication instead of the position data of the mobile telephone apparatus to make the mobile telephone base station inform the telephone network of the external position data instead of the position data of the mobile telephone apparatus.

10) A mobile telephone system as described in the above-mentioned item 9), wherein the mobile telephone apparatus further comprises a display section (2) for displaying map information specified by one of the external position data and the position data of the mobile telephone apparatus, the mobile telephone apparatus receiving, upon display of the map information in the display section, the map information through the mobile telephone base station from the telephone network by transmitting the one of the external position data and the position data of the mobile telephone apparatus through the mobile telephone base station to the telephone network, 11) A mobile telephone system as described in the above-mentioned item 10), wherein the map information is obtained by the use of a homepage of an internet connected through a router (40a) to the telephone network.

12). A mobile telephone system as described in the above-mentioned item 8), wherein the mobile telephone apparatus further comprises a control section (5) for carrying out power supply intermittent control to intermittently energize the first GPS unit so that the first GPS unit is intermittently turned on under the power supply intermittent control.

13) A mobile telephone system comprising:

a mobile telephone base station (20) connected to a telephone network (40); and a mobile telephone apparatus (10) which comprises a first GPS unit (6) for receiving a GPS wave as a first received GPS signal to obtain position data of the mobile telephone apparatus by information processing with reference to the first received GPS signal and a radio section (3) connected to the first GPS unit for transmitting, by radio communication, the position data of the mobile telephone apparatus to the mobile telephone base station to make the mobile telephone base station inform the telephone network of the position data of the mobile telephone apparatus;

the radio section of the mobile telephone apparatus transmitting by radio communication to the mobile telephone base station, when the first GPS unit does not receive the GPS wave and does not obtain the position data of the mobile telephone apparatus, previous data obtained last as the position data of the mobile telephone apparatus to make the mobile telephone base station inform the telephone network of the previous data as current position data of the mobile telephone apparatus.

14) A mobile telephone system as described in the above-mentioned item 13), wherein the radio section of the mobile telephone apparatus transmits by radio communication to the mobile telephone base station, when the first GPS unit does not receive the GPS wave and does not obtain the position data of the mobile telephone apparatus, the previous data and time instant data to make the mobile telephone base station inform the telephone network of the previous data and the time instant data as the current position data of the mobile telephone apparatus, the time instant data representing a time instant when the previous data are obtained as the position data of the mobile telephone apparatus.

15) A mobile telephone system as described in the above-mentioned item 13), wherein the mobile telephone apparatus further comprises a control section (5) for carrying out power supply intermittent control to intermittently energize the first GPS unit so that the first GPS unit is intermittently turned on under the power supply intermittent control.

DESCRIPTION OF THE PREFERRED EMBODIMENT

In conjunction with an embodiment given below, description will be made in detail about a mobile telephone system of this invention with reference to the drawing.

Figure 1:
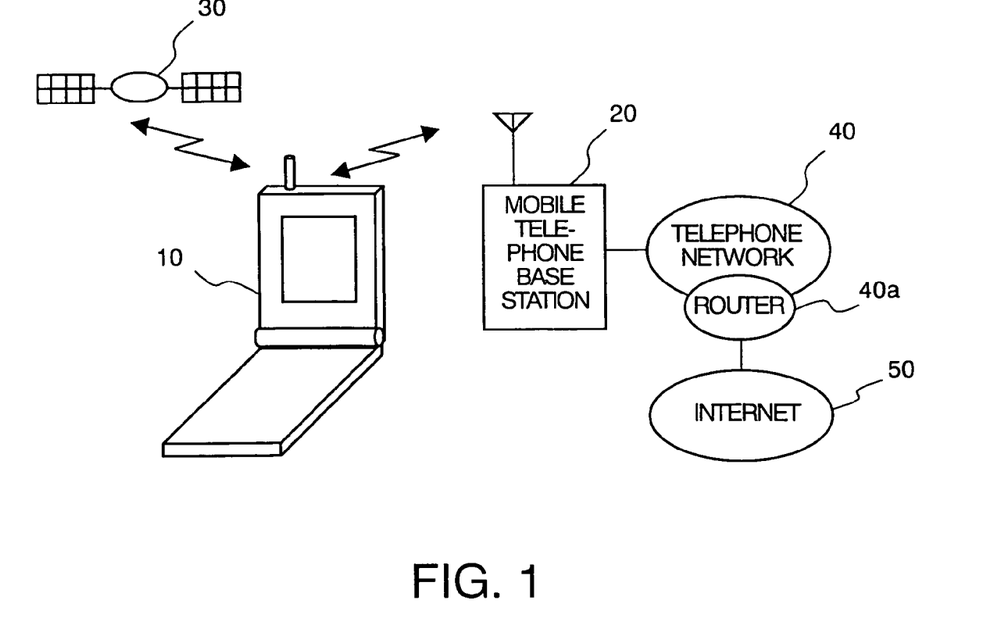
FIG. 1 is a schematic view showing a basic structure of a mobile telephone system according to one embodiment of this invention.

Referring to FIG. 1, the mobile telephone system is constructed as a network system and comprises a mobile telephone apparatus 10, a mobile telephone base station 20, a GPS satellite 30, a telephone network 40, and the Internet 50. The GPS satellite 30 transmits GPS information including time instant information, position information, and map information. The mobile telephone apparatus 10 includes a first GPS unit adapted to receive the GPS information transmitted from the GPS satellite 30. The mobile telephone apparatus 10 is adapted to transmit via radio communication position data of the apparatus itself that is obtained by information processing with reference to the GPS information. The mobile telephone base station 20 is adapted to receive the position data vi radio communication from the mobile telephone apparatus 10. The mobile telephone base station 20 includes a second GPS unit adapted to receive the GPS information transmitted from the GPS satellite 30 and including the time instant information, the position information, and the map information. The mobile telephone base station 20 is adapted to transmit position information (applicable as the position data) of the station itself that is contained in the GPS information to the mobile telephone apparatus via radio communication. The telephone network 40 is connected to the mobile telephone base station 20. The internet 50 is connected to a router 40a equipped in the telephone network 40.

Specifically, the mobile telephone system described above has a basic function such that the mobile telephone apparatus 10 provided with the first GPS unit adapted to receive the GPS information transmitted from the GPS satellite 30 obtains the position data of the apparatus itself by information processing with reference to the GPS information and reports the position data to the telephone network 40 connected to the mobile telephone base station 20 via radio communication to the mobile telephone base station 20. In addition, since the mobile telephone base station 20 is provided with the second GPS unit adapted to receive the GPS information transmitted from the GPS satellite, the mobile telephone base station 20 has a function of acquiring position information of the station itself (preliminarily memorized as being identifiable for each individual station) contained in the GPS information and applicable as the position data and transmitting via radio communication the station position information by including it in report information to be reported to the mobile telephone apparatus 10.

This provides a function such that, in case where the position data are to be reported to the telephone network 40 via radio communication to the mobile telephone base station 20 and if the first GPS unit fails to appropriately receive the GPS information so that the position data can not be obtained, the mobile telephone apparatus 10 transmits, instead of the position data, the station position information obtained by the second GPS unit and supplied from the mobile telephone base station 20. As a consequence, even if a reception state of direct reception of the GPS information by the mobile telephone apparatus 10 is inferior, it is possible to effectively utilize the GPS information from the GPS satellite 30 by substituting the position information of the station itself contained in the GPS information and supplied from the mobile telephone base station 20 by the use of radio communication.

Figure 2:
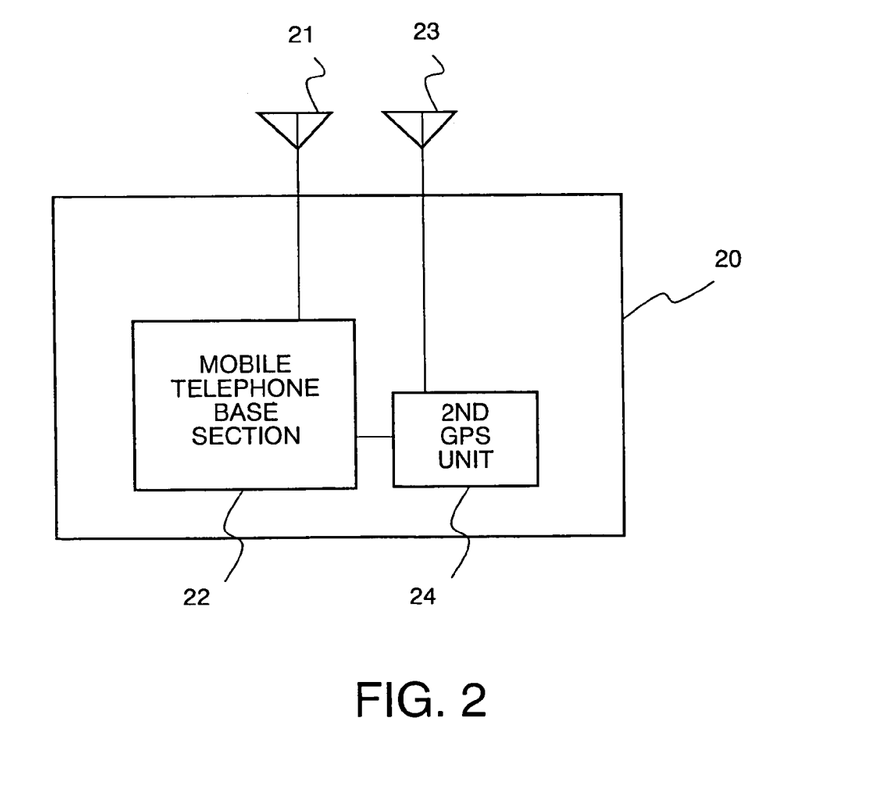
FIG. 2 is a schematic view showing a basic structure of a mobile telephone base station in the mobile telephone system illustrated in FIG. 1.

Referring to FIG. 2, the mobile telephone base station 20 comprises a mobile telephone base section 22 adapted to carry out radio communication via a mobile antenna 21 and a second GPS unit 24 adapted to carry out GPS communication via a GPS antenna 23 and has a portable structure in which the mobile antenna 21 and the GPS antenna 23 are arranged on a same station building or housing. Herein, the mobile telephone base section 22 and the second GPS unit 24 are connected to each other. The mobile antenna 21 is connected to the mobile telephone base section 22 while the GPS antenna 23 is connected to the second GPS unit 24.

In the mobile telephone base station 20, the position information contained in the GPS information obtained by the use of the second GPS unit 24 can be transmitted via radio communication through the GPS antenna 23 to the mobile telephone apparatus 10. It is noted here that, if the mobile telephone base station 20 is arranged in a place beyond a radio wave of the GPS information, such as an underground mall, the longitude and the latitude of the place of arrangement must be read from the map information or the like and stored in a memory. In case where the mobile telephone base station 20 transmits the position information to the mobile telephone apparatus 10, the position information is superposed on the report information to be transmitted in common to all mobile telephone apparatuses 10 present in a communication area.

Figure 3:
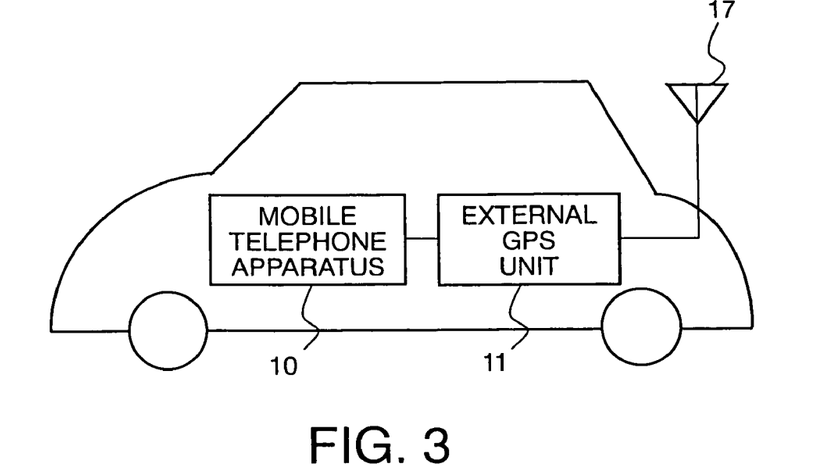
FIG. 3 is a schematic view showing an arrangement in case where the mobile telephone apparatus in the mobile telephone system illustrated in FIG. 1 is brought into an automobile and used in combination with an external GPS unit providing car navigation.

Referring to FIG. 3, the mobile telephone apparatus 10 of the above-mentioned mobile telephone system is brought into the automobile and used in combination with an external GPS unit 11 providing car navigation. The external GPS unit 11 has a GPS antenna 17 arranged outside the automobile to serve as radio communication connecting means. Herein, the mobile telephone apparatus 10 is connected to the external GPS unit 11 providing the car navigation and adapted to receive the GPS information transmitted from the GPS satellite 30. In the mobile telephone system, in case where the position data are to be reported to the telephone network 40 via radio communication to the mobile telephone base station 20 and if the first GPS unit contained in the mobile telephone apparatus 10 fails to appropriately receive the GPS information so that the position data can not be obtained, the mobile telephone apparatus 10 transmits, instead of the position data, the position information indirectly obtained from the external GPS unit 11 through the GPS antenna 17 by information processing. With this structure also, in case where the reception state of direct reception of the GPS information at the mobile telephone apparatus 10 is inferior, the GPS information from the GPS satellite 30 can effectively be utilized by substituting the position information contained in the GPS information and supplied from the external GPS unit 11 using radio communication through the GPS antenna 17.

Figure 4:
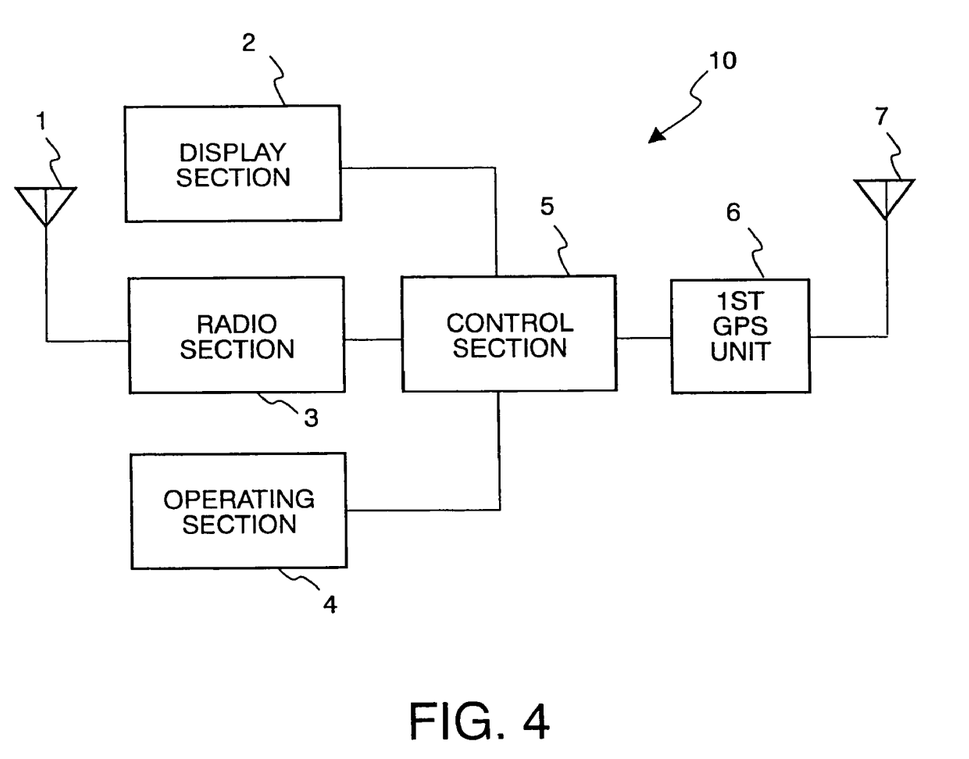
FIG. 4 is a block diagram showing a basic structure of the mobile telephone apparatus in the mobile telephone system illustrated in FIG. 1.

Referring to FIG. 4, the mobile telephone apparatus 10 comprises a radio section 3 serving as a mobile telephone set adapted to carry out radio communication via a mobile antenna 1, a first GPS unit 6 adapted to carry out GPS communication via a GPS antenna 7, a control section 5 connected between the radio section 3 and the first GPS unit 6 for carrying out communicating operation control upon radio communication and GPS communication, an operating section 4 having a plurality of key switches for requesting control operation at the control section 5, and a display section 2 for displaying display data supplied from inside and outside of the apparatus. The control section 5 is connected not only to the radio section 3 connected to the mobile antenna 1 and the first GPS unit 6 connected to the GPS antenna 7 but also to the display section 2 and the operating section 4.

Among others, the control section 5 carries out communicating operation control upon radio communication and GPS communication and power supply intermittent control for intermittently energizing the first GPS unit 6 so that the first GPS unit 6 is intermittently turned on under the power supply intermittent control. Herein, the control section 5 carries out power supply control to energize the radio section 3 upon radio communication under the communicating operation control, carries out power supply intermittent control only when the radio communication is in an intermittent standby state, and carries out power supply continuous control to continuously energize the first GPS unit 6 when the radio communication is in a busy state. Thus, the first GPS unit 6 is continuously turned on under the power supply continuous control.

Figure 5:
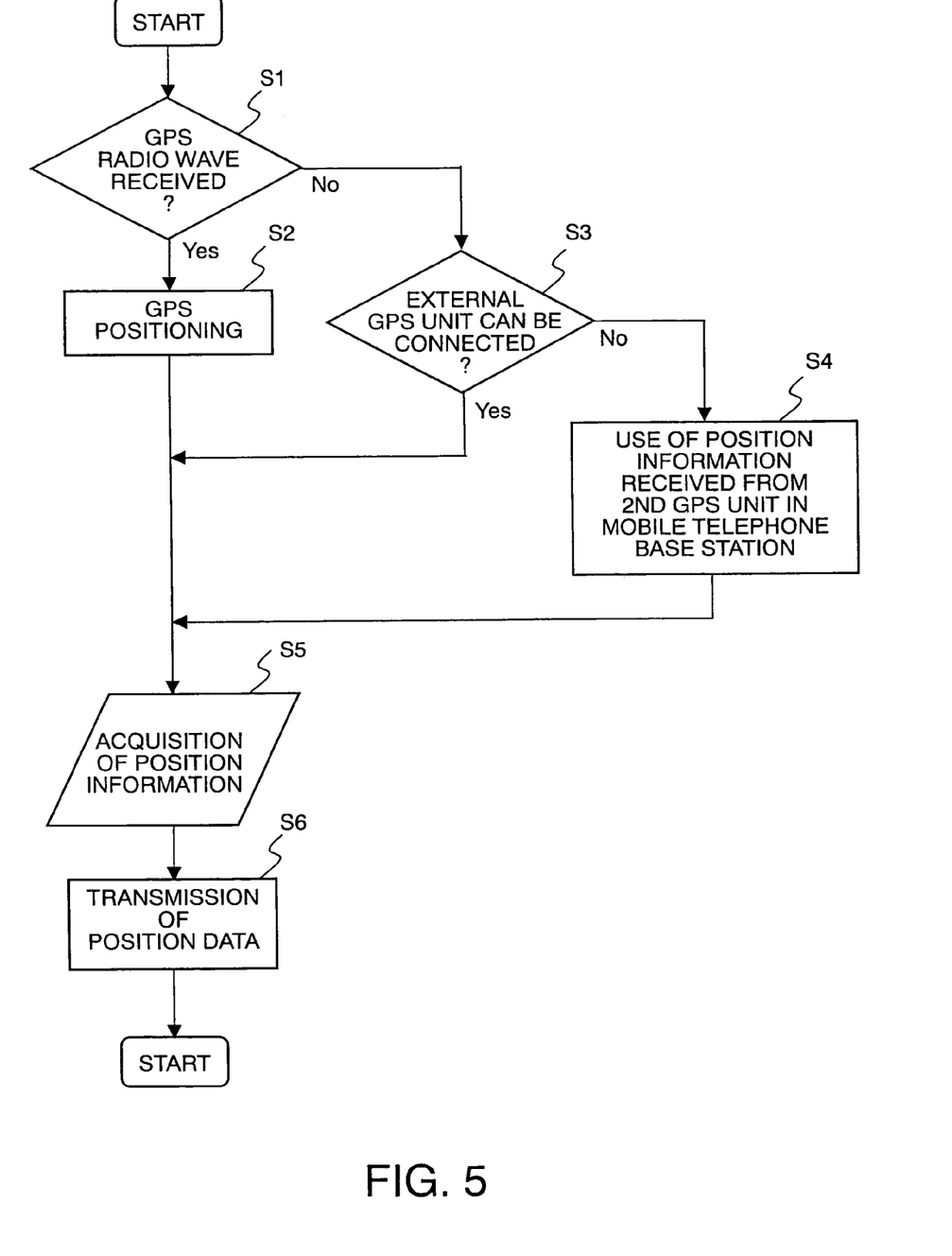
FIG. 5 is a flow chart showing an operation of communicating operation control by a control section of the mobile telephone apparatus illustrated in FIG. 4.

Referring to FIG. 5, the operation of the communicating operation control of the control section 5 in the mobile telephone apparatus 10 will be described. Herein, the mobile telephone apparatus 10 is required to transmit the position data through the mobile telephone base station 20 to the telephone network 40.

At first, when the operation is started, the control section 5 judges whether or not the first GPS unit 6 successfully receives a radio wave of current GPS information by detecting presence or absence of the GPS wave (step S1). In presence of the GPS wave, GPS positioning is performed in which the first GPS unit 6 carries out positioning with reference to the current GPS information (step S2) and then acquires position information contained in the GPS information (step S5). Thereafter, the position information acquired is subjected to information processing to obtain the position data. The position data are transmitted (step S6) and the operation comes to an end.

On the other hand, in absence of the GPS wave as a result of judgment of whether or not the GPS wave is present (step S1), the control unit 5 judges whether or not connection with the external GPS unit 11 is possible (step S3). If connection is possible, the external GPS unit 11 acquires position information contained in the GPS information (step S5). Thereafter, the position information acquired is subjected to information processing to obtain the position data. The position data are transmitted (step S6) and the operation comes to an end. If connection is impossible, use is made of the position information supplied from the second GPS unit 24 of the mobile telephone base station 20 (step S4). After the position information is acquired (step S5), the position data obtained by information processing of the position information acquired is transmitted (step S6) and the operation comes to an end.

Figure 6:
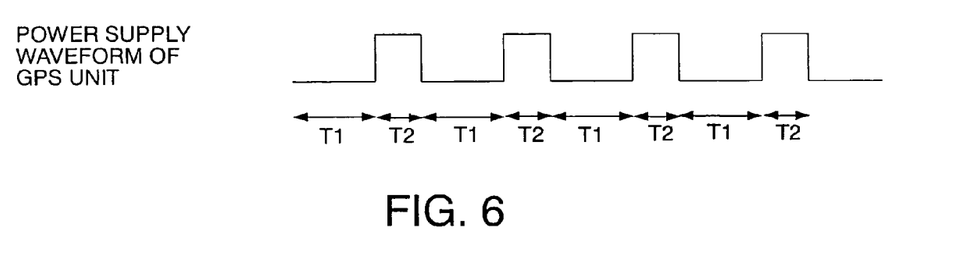
FIG. 6 is a timing chart showing a power supply waveform of a first GPS unit under power supply intermittent control by the control section of the mobile telephone apparatus illustrated in FIG. 4 in relation to an off period and an on period.

Referring to FIG. 6, a power supply waveform of the first GPS unit 6 is illustrated in relation to an off period T1 and an on period T2 under the power supply intermittent control by the control section 5 of the mobile telephone apparatus 10. Herein, the control section 5 carries out power supply to the first GPS unit 6 under the power supply intermittent control in which the off period T1 and the on period T2 are successively continued as illustrated in the figure. The on period T2 is a minimum time interval required for reception of the radio wave. The off period T1 is selected to be a time interval on the order of 10 times that of the on period T2.

Herein, upon judging reception of the radio wave of the GPS information during the on period T2, the control section 5 temporarily interrupts the power supply intermittent control and starts the power supply continuous control to continuously energize the first GPS unit 6. As a consequence, the first GPS unit 6 is continuously turned on to receive the GPS information. When the reception of the GPS information is completed, the power supply intermittent control is carried out again at the timing illustrated in FIG. 6. Also in case where the position data are required to be transmitted by the use of the first GPS unit 6, the control section 5 temporarily interrupts the power supply intermittent control and starts the power supply continuous control to continuously energize the first GPS unit 6 in the similar manner. The first GPS unit 6 is continuously turned on to perform transmission of the position data. At the time instant when the transmission of the position data is completed, the power supply intermittent control is again carried out. Furthermore, in case where the first GPS unit 6 can not receive the GPS information continuously for a predetermined time duration or more under the communicating operation control, the control section 5 increases the power supply off period in the power supply intermittent control.

Figure 7:
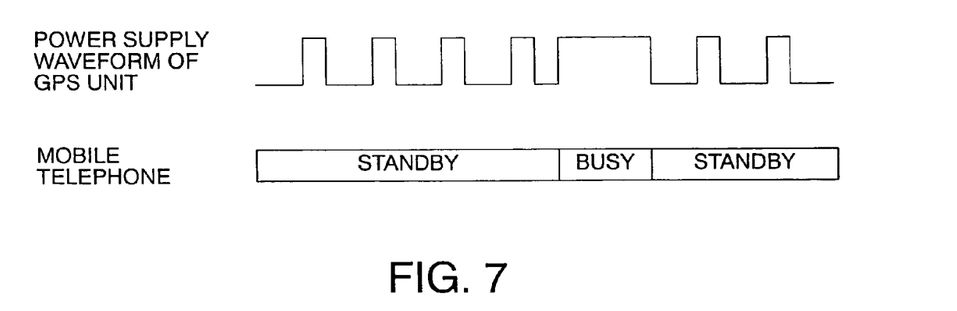
FIG. 7 is a timing chart showing a power supply waveform of the first GPS unit under the power supply intermittent control or power supply continuous control in dependence upon a radio communication (mobile communication) state under power supply control upon a radio section by the control section of the mobile telephone apparatus illustrated in FIG. 4.

Referring to FIG. 7, illustrated is a power supply waveform of the first GPS unit 6 under the power supply intermittent control or the power supply continuous control depending upon the radio communication (mobile communication) state under the power supply control upon the radio section 3 by the control section 5 in the mobile telephone apparatus 10. Herein, if the radio communication by the first radio section 3 is in the intermittent standby state, the control section 5 carries out the power supply intermittent control upon the first GPS unit 6. if the radio communication is in the busy state, the control section 5 carries out the power supply continuous control upon the first GPS unit 6. Furthermore, if the radio communication reaches a communication end point, the control section 5 again carries out the power supply intermittent control upon the first GPS unit 6.

Figure 8:
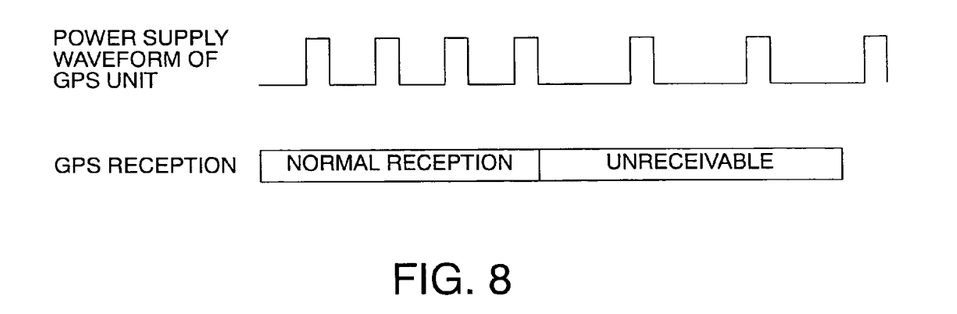
FIG. 8 is a timing chart showing a power supply waveform of the first GPS unit in dependence upon a GPS information reception (GPS reception) state under the power supply intermittent control upon the first GPS unit by the control section of the mobile telephone apparatus illustrated in FIG. 4.

Herein, the control section 5 confirms the reception state of the radio wave of the GPS information in the power supply intermittent control upon the first GPS unit 6. In case of normal reception, the control section 5 carries out the power supply intermittent control at the timing identical with that illustrated in FIG. 6. On the other hand, in case where no radio wave is received consecutively for a predetermined time duration or more, the power supply off period under the power supply intermittent control is increased as illustrated in FIG. 8 (for example, an off period T3 illustrated in FIG. 8 has an extended time interval corresponding to about twice that of the off period T1). Upon reception of the radio wave, the off period is returned to the initial preselected time interval. Thus, low current consumption is achieved.

Although the above-mentioned mobile telephone apparatus 10 is provided with the first GPS unit 6 for carrying out GPS communication, the control section 5 carries out the power supply intermittent control only in the intermittent standby state of radio communication under the communicating operation control to intermittently turn on the first GPS unit 6. Therefore, the current consumption is reduced to enable the power supply using a battery and to reduce the power consumption.

In the meanwhile, the above-mentioned mobile telephone apparatus 10 comprises the operating section 4 having a plurality of key switches for requesting the control operation including the power supply control and the power supply intermittent control by the control section 5. The key switches of the operating section 4 include a mobile power supply key for requesting switching operation between on and off of power supply to the radio section 3 upon the power supply control by the control section 5, and a communication power supply key for requesting switching operation between on and off of intermittent power supply to the first GPS unit 6 upon the power supply intermittent control by the control section 5. It is noted here that, even if the power supply control is turned off by the mobile power supply key of the operating section 4, the control section 5 carries out the power supply intermittent control to intermittently turn on the first GPS unit 6 as far as the power supply intermittent control is turned on by the communication power supply key. Thus, the control section 5 detects and memorizes on or off of the mobile power supply key and on or off of the communication power supply key every time when the mobile power supply key or the communication power supply key of the operating section 4 is pressed.

Description will be made of the power supply control operation upon the first GPS unit 6 by the control section 5 in response to on or off of the mobile power supply key and the communication power supply key of the operating section 4. The control section 5 carries out the power supply control operation upon the first GPS unit 6 in response to on or off of the communication power supply key irrespective of on or off of the mobile power supply key in the operating section 4. Specifically, if the communication power supply key is turned on, the control section 5 carries out the power supply intermittent control. If the communication power supply key is turned off, the control section 5 carries out power supply off control to turn off the first GPS unit 6. Thus, the control section 5 suspends the control operation if both of the mobile power supply key and the communication power supply key are turned off. If any one of the mobile power supply key and the communication power supply key is pressed, the control operation is stopped leaving the detecting function.

As described above, the control section 5 extends the power supply off interval in the power supply intermittent control upon the first GPS unit 6 if the first GPS unit 6 can not receive the GPS communication. Alternatively, the key switches in the operating section 4 separately include the mobile power supply key for requesting switching operation between on and off of power supply to the radio section 3 and the communication power supply key for requesting switching operation between on and off of the intermittent power supply to the first GPS unit 6. Thus, the radio section 3 and the first GPS unit 6 can individually be turned on and off. This also serves to reduce the current consumption.

Summarizing, in the above-mentioned mobile telephone apparatus 10, the operating section 4 turns on the power supply control by the use of the mobile power supply key and turns off the power supply intermittent control by the communication power supply key upon the radio communication under the communicating operation control as a normal state. The operating section 4 turns on the power supply intermittent control in case where transmission of the position data or reception of position information by the GPS communication is required and turns off the power supply intermittent control in case where the GPS communication is completed. At this time, the control section 5 carries out the power supply intermittent control upon reception of the GPS information (position information) to intermittently turn on the first GPS unit 6.

The above-mentioned mobile telephone apparatus 10 comprises the display section 2 adapted to display map data. Upon displaying the map data in the display section 2, the mobile telephone apparatus 10 has a function of receiving map information applicable as the map data from the telephone network 40 via radio communication from the mobile telephone base station 20 by the use of the homepage of the internet 50 connected through the router 40a to the telephone network 40, with reference to one of the position data directly obtained from the first GPS unit 6 contained in the apparatus by information processing of the GPS information, the position information indirectly obtained from the second GPS unit 24 through radio communication from the mobile telephone base station 20 by information processing of the GPS information, and the position information indirectly obtained from the external GPS unit 11 via radio communication through the GPS antenna 17 by information processing of the GPS information.

Figure 9:
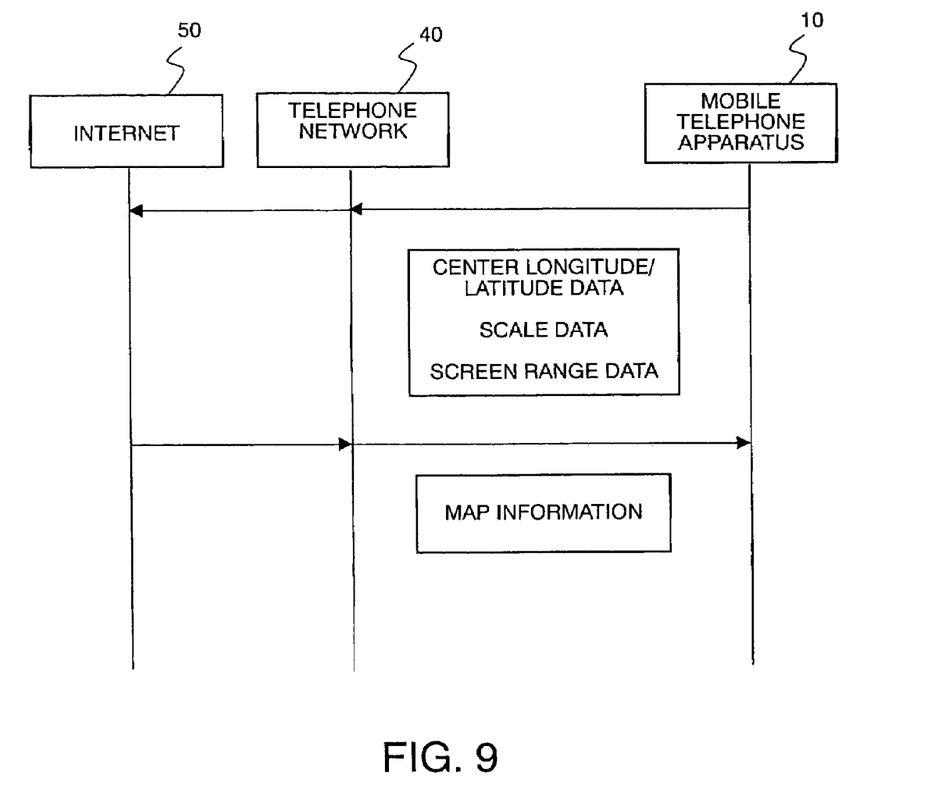
FIG. 9 is a flow chart showing a sequence of operations in a process of displaying map information in a display section of the mobile telephone apparatus in the mobile telephone system illustrated in FIG. 1.

Referring to FIG. 9, description will be made of a sequence of operations in a process of displaying the map information in the display section 2 in the above-mentioned mobile telephone apparatus 10. Herein, the mobile telephone apparatus 10 carries out a call originating operation to establish connection with the telephone network 40 through the mobile telephone base station 20. Thereafter, the mobile telephone apparatus 10 produces a connection request with the internet 50. The connection with the internet 50 is established and the homepage providing the map information is accessed. The communication sequence mentioned above is similar to the connection protocol in the existing mobile telephone system. Herein, the mobile telephone apparatus 10 transmits, via the telephone network 40 to the internet 50, the center latitude/longitude data representative of the center latitude and the center longitude, scale data representative of the scale, and screen range data representative of the screen range. As a result, the mobile telephone apparatus 10 receives the map information transmitted via the telephone network 40 through the network of the internet 50, and carries out information processing of the map information to produce the map data which are displayed in the display section 2.

If the map information contained in the GPS information received by the second GPS unit 24 of the mobile telephone base station 20 itself can be transmitted to the mobile telephone apparatus 10 via radio communication, the map information is available without relying upon the network of the internet 50. Furthermore, the map information can directly be obtained from the mobile telephone base station 20 by the first GPS unit 6 contained in the mobile telephone apparatus 10 itself. However, since a wide variety of map information is accumulated in the homepages of the internet 50 at present, the structure utilizing the internet 50 is superior in convenience and eliminates the need of enormous facility investment for the mobile telephone base station 20.

As a consequence, even if the reception state of direct reception of the GPS information is inferior in the mobile telephone apparatus 10, the GPS information from the GPS satellite 30 can effectively be utilized by indirectly obtaining the GPS information derived from the telephone network 40 utilizing the homepage of the internet 50 and sent via the radio communication from the mobile telephone base station 20 and substituting the map information contained therein as the map data.

Furthermore, the above-mentioned mobile telephone apparatus 10 comprises a clock section (not shown) indicating the time instant. Upon indication of the time instant at the clock section, the mobile telephone apparatus 10 is periodically corrected with reference to one of the time instant data directly obtained from the first GPS unit 6 contained therein by information processing of the GPS information, time instant information indirectly obtained from the second GPS unit 24 via radio communication from the mobile telephone base station by information processing of the GPS information, and the time instant information indirectly obtained from the external GPS unit 11 via radio communication through the GPS antenna 17 by information processing of the GPS information.

Specifically, the mobile telephone apparatus 10 performs a basic operation in which the first GPS unit 6 contained therein receives the radio wave of the GPS information. In case where the first GPS unit 6 can not receive the radio wave of the GPS information, the control section 5 carries out information processing of the time instant information indirectly obtained from the second GPS unit 24 via radio communication from the mobile telephone base station 20 by information processing of the GPS information, or the time instant information indirectly obtained from the external GPS unit 11 via radio communication through the radio communication connecting means by information processing of the GPS information. Thus, the time instant data are obtained to correct the time instant indication by a clock function preliminarily provided. The clock function of the control section 5 itself is less accurate than the realtime indication of the quartz oscillator, such as the clock information of the GPS information. Under the circumstances, the function of correcting the time instant is effective in improvement of the time instant indication of the mobile telephone apparatus 10. It is noted here that the correction of the time instant can be carried out at every predetermined time instant (for example, 0:00 AM) in a day. Alternatively, the timing of the interval can be selected to any desired timing, for example, every one hour or every six hours.

Figure 10:
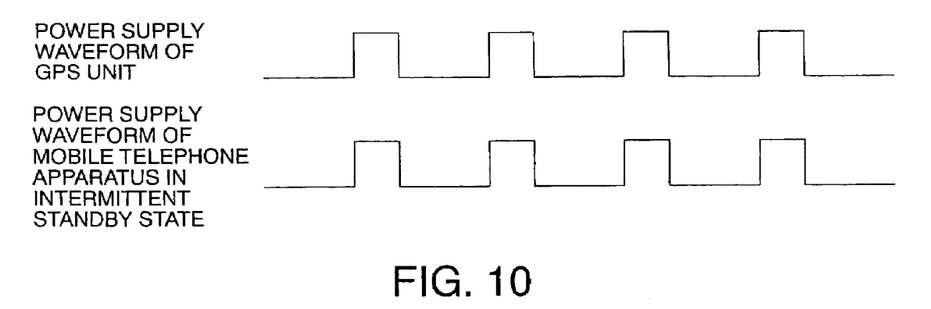
FIG. 10 is a timing chart showing comparison between a power supply waveform in case where the radio communication (mobile communication) state is an intermittent standby state under the power supply control upon the radio section and a power supply waveform of the first GPS unit under the power supply intermittent control when the timing of the power supply intermittent control by the control section of the mobile telephone apparatus in the mobile telephone system illustrated in FIG. 1 is changed.

Referring to FIG. 10, comparison is made between a power supply waveform in case where the radio communication (mobile communication) state is an intermittent standby state under the power supply control upon the radio section 3 and a power supply waveform of the first GPS unit 6 under the power supply intermittent control when the timing of the power supply intermittent control by the control section 5 of the mobile telephone apparatus 10 in the mobile telephone system is changed.

Herein, the power supply intermittent control by the control section 5 upon the first GPS unit 6 is carried out in synchronism with the timing of the intermittent standby state of the radio communication state under the power supply control upon the radio section 3. As a consequence, the power supply waveform of the first GPS unit 6 under the power supply intermittent control is coincident with the power supply waveform of the radio section 3 in the intermittent standby state under the power supply control.

With the above-mentioned structure, as compared with the case where the power supply control upon the radio section 3 and the power supply intermittent control upon the first GPS unit 6 are separately carried out by the control section 5 in the mobile telephone apparatus 10, the current consumption can further be reduced because the receiving operations of both the radio section 3 and the first GPS unit 6 can simultaneously be carried out.

In this case, it is only necessary that the rise of the power supply of the first GPS unit 6 is synchronized with the timing of the intermittent standby state of the mobile telephone apparatus 10. In the example being illustrated in FIG. 10, every time when the power supply waveform of the mobile telephone apparatus 10 in the intermittent standby state rises, the power supply waveform of the first GPS unit 6 rises into an on state. Alternatively, modification is possible such the power supply waveform of the first GPS unit 6 rises once per N times of intervals at the rise of the power supply waveform of the intermittent standby of the mobile telephone apparatus 10. It is also effective that the waveform of the first GPS unit 6 does not rise if the mobile telephone apparatus 10 is used beyond a GPS communication zone. Furthermore, upon using the mobile telephone apparatus 10, control is carried out so that the first GPS unit 6 is turned off in the normal state, is turned off when the position information is required, and is turned off when the position information is received. In this manner, the current consumption can be reduced.

Finally, description will be made of a bypass function in case where the first GPS unit 6 contained in the mobile telephone apparatus 10 can not appropriately receive the GPS information including the position information. The first GPS unit 6 of the mobile telephone apparatus 10 illustrated in FIG. 4 always memorizes the position data representative of the position information and the time instant data representative of the time instant information as a pair and does not update the position data if the radio wave of the GPS information can not be received. If the position data are required, the control section 5 inquires the first GPS unit 6 about the reception state of the radio wave of the GPS information. If the reception is impossible, the position data memorized by the first GPS unit are acquired and transmitted to the mobile telephone base station 20 together with the time instant data memorized in pair.

Figure 11:
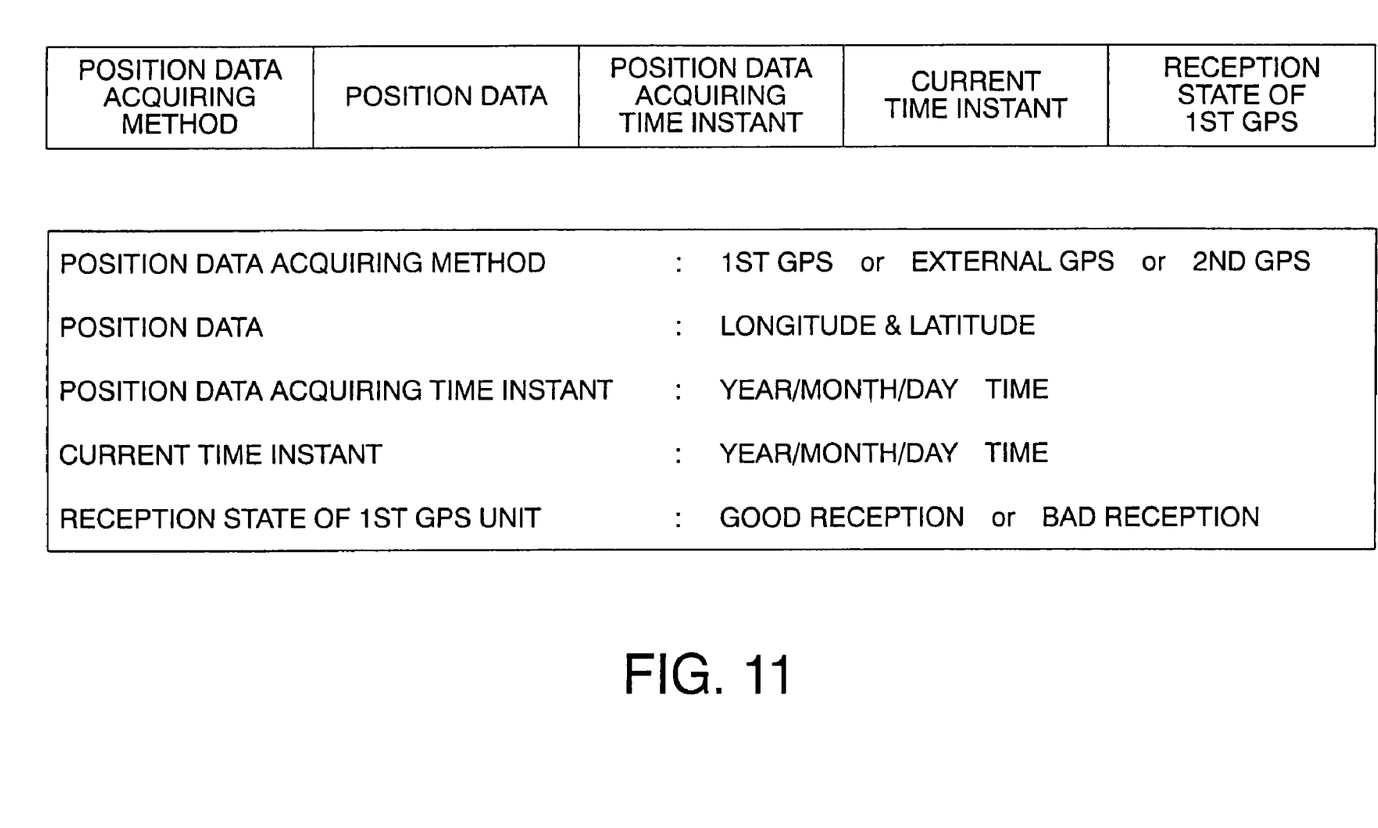
FIG. 11 is a view exemplifying a format of transmission data including time instant data and other data affixed upon transmission control of position data by the control section of the mobile telephone apparatus in the mobile telephone system illustrated in FIG. 1.

FIG. 11 exemplifies the format of transmission data including the time instant data provided upon transmission control of the position data by the control section 5 of the mobile telephone apparatus 10 in the mobile telephone system as well as other data. Herein, when the mobile telephone apparatus 10 sends the position data to the telephone network 40 via radio communication to the mobile telephone base station 20, those data representative of the acquiring method and the acquiring time instant related to the position data, the current time instant, and the reception state (internal GPS reception state) of the first GPS unit 6 are provided together as the transmission data.

The mobile telephone apparatus 10 has a function of transmitting, in case where the position data are to be reported to the telephone network 40 via radio communication to the mobile telephone base station 20 and if the first GPS unit 6 fails to appropriately receive the GPS information so that the position data can not be obtained, appropriate previous data obtained last instead of the current data in the transmission data containing the position data. The mobile telephone apparatus 10 also has another function of transmitting, upon transmission of the previous data in the transmission data containing the position data, the time instant data representing the time instant when the previous data are acquired and obtained by information processing with reference to the GPS information. As a consequence, even if the reception state of direct reception of the GPS information at the mobile telephone apparatus 10 is inferior, the mobile telephone base station 20 in the mobile telephone system can acquire detailed data of another mobile telephone apparatus 10 as another party in a good reception state immediately before.

Consideration will be made of the case where the mobile telephone apparatus 10 has a function of transmitting the previous data and, upon displaying operation of the map data in the display section 2 by the use of the homepage of the internet 50, selects the position data directly obtained from the first GPS unit 6 contained in the apparatus by information processing of the GPS information. In this event, in case where the position data are to be reported to the telephone network 40 via radio communication to the mobile telephone base station 20 and if the first GPS unit 6 fails to appropriately receive the GPS information so that the position data can not be obtained, the appropriate previous data can be selected and transmitted instead of the current data.

It is assumed that the transmission data are transmitted in the above-mentioned manner. In this event, even if the first GPS unit 6 contained in the mobile telephone apparatus 10 can not receive the radio wave of the GPS information, the control section 5 memorizes the position information and the time instant information at the time instant when the first GPS unit 6 have appropriately received the GPS information immediately before and, under the transmission control, the transmission data containing the position data and the time instant data obtained by information processing of those information are transmitted through the mobile telephone base station 20 to another party involved in communication. Thus, it is possible to know where a user of the mobile telephone apparatus 10 has been at least at a particular time instant. This provides utility data which greatly benefits another person who wants to know the position of the user of the mobile telephone apparatus 10 (for example, who receives an emergency report).

As described above, the mobile telephone system according to this invention has a basic structure in which the mobile telephone base station has a function of reporting the position information of the station itself to the mobile telephone apparatus. In addition, the mobile telephone apparatus has a function of transmitting the position data obtained by information processing of the position information contained in the GPS information selectively obtained from one of the first GPS unit contained in the mobile telephone apparatus, the second GPS unit provided in the mobile telephone base station, and the external GPS unit connected through the radio communication connecting means. Therefore, even if the first GPS unit contained in the mobile telephone apparatus fails to receive the radio wave of the GPS information, the position data can be transmitted to the mobile telephone base station. As a result, even if the reception state of direct reception of the GPS state at the mobile telephone apparatus is inferior, the GPS information can effectively be utilized by the use of radio communication.

The mobile telephone system mentioned above has a function of receiving, upon displaying the map data in the display section contained, the map information applicable as the map data from the telephone network via radio communication from the mobile telephone base station by the use of the homepage of the internet connected through the router to the telephone network, with reference to one of the position data directly obtained from the first GPS unit by information processing of the GPS information, the position information indirectly obtained from the second GPS unit via radio communication from the mobile telephone base station by information processing of the GPS information, and the position information indirectly obtained from the external GPS unit via radio communication through the radio communication connecting means by information processing of the GPS information. Furthermore, the system has a function of periodically correcting the indication of the time instant at the clock section contained, with reference to one of the time instant data directly obtained from the first GPS unit by information processing of the GPS information, the time instant information indirectly obtained from the second GPS unit via radio communication from the mobile telephone base station by information processing of the GPS information, and the time instant information indirectly obtained from the external GPS unit via radio communication through the radio communication connecting means by information processing of the GPS information. Therefore, it is possible to easily obtain and utilize the map information, to indicate the accurate time instant, and to achieve the reduction in size, weight, and cost because of low memory capacity without requiring an enormously large memory capacity for the map data.

Furthermore, the mobile telephone apparatus includes the control section for carrying out the communicating operation control upon the radio communication at the radio section serving as a mobile telephone set adapted to carry out radio communication and upon the GPS communication at the first GPS unit contained therein. The control section carries out power supply control to energize the radio section upon the radio communication, carries out the power supply intermittent control to intermittently energize the first GPS unit only when the radio communication is in the intermittent standby state, and carries out the power supply continuous control to continuously energize the first GPS unit when the radio communication is in a busy state. This provides the function of intermittently turning on the power supply to the first GPS unit having large current consumption to minimize the power supply so that the low power consumption of the mobile telephone apparatus is achieved.

In particular, in the above-mentioned mobile telephone apparatus, in case where the first GPS unit contained therein fails to receive the radio wave of the GPS information, the control section increases the interval of the power supply off period in the power supply intermittent control for the first GPS unit. Alternatively, the operating section separately includes as the key switches the mobile power supply key for requesting switching operation between on and off the power supply to the radio section and the communication power supply key for requesting switching operation between on and off of the intermittent power supply to the first GPS unit. With this structure, the radio section and the first GPS unit can individually be turned on and off. This achieves further reduction in current consumption (reduction in power consumption). Furthermore, the system is given the function such that the first GPS unit continuously acquires the position information If the mobile power supply key alone is turned off in case where the radio communication by the mobile telephone apparatus is not necessary. In addition, in case of emergency, the mobile power supply key is immediately turned on to immediately transmit the position data.

What is claimed is:

1. A mobile telephone system comprising:
   a mobile telephone base station (20) connected to a telephone network (40); and
   a mobile telephone apparatus (10) which comprises a first GPS unit (6) for receiving a GPS wave as a first received GPS signal to obtain position data of said mobile telephone apparatus by information processing with reference to said first received GPS signal and a radio section (3) connected to said first GPS unit for transmitting, by radio communication, the position data of said mobile telephone apparatus to said mobile telephone base station to make said mobile telephone base station inform said telephone network of the position data of said mobile telephone apparatus;
   the radio section of said mobile telephone apparatus transmitting by radio communication to said mobile telephone base station, when said first GPS unit does not receive the GPS wave and does not obtain the position data of said mobile telephone apparatus, previous data obtained last as the position data of said mobile telephone apparatus to make said mobile telephone base station inform said telephone network of said previous data as current position data of said mobile telephone apparatus.

2. A mobile telephone system as claimed in claim 1, wherein the radio section of said mobile telephone apparatus transmits by radio communication to said mobile telephone base station, when said first GPS unit does not receive the GPS wave and does not obtain the position data of said mobile telephone apparatus, said previous data and time instant data to make said mobile telephone base station inform said telephone network of said previous data and said time instant data as the current position data of said mobile telephone apparatus, said time instant data representing a time instant when said previous data are obtained as the position data of said mobile telephone apparatus.

3. A mobile telephone system as claimed in claim 1, wherein said mobile telephone apparatus further comprises a control section (5) for carrying out power supply intermittent control to intermittently energize said first GPS unit so that said first GPS unit is intermittently turned on under said power supply intermittent control.

* * * * *